(12) United States Patent
Mo et al.

(10) Patent No.: US 12,269,534 B2
(45) Date of Patent: Apr. 8, 2025

(54) VEHICLE BODY FOR VEHICLE (71) Applicants: Hyundai Motor Company, Seoul (KR); Kia Corporation, Seoul (KR)

(72) Inventors: Jin Young Mo, Hwaseong-si (KR); Hyun Cheol Yun, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 393 days.

(21) Appl. No.: 17/873,974

(22) Filed: Jul. 26, 2022

(65) Prior Publication Data

US 2023/0249749 A1 Aug. 10, 2023

(30) Foreign Application Priority Data

Feb. 9, 2022 (KR) .......................... 1020220016747

(51) Int. Cl.
*B62D 24/00* (2006.01)
*B62D 21/11* (2006.01)
*B62D 65/02* (2006.01)

(52) U.S. Cl.
CPC .............. *B62D 24/00* (2013.01); *B62D 21/11* (2013.01); *B62D 65/02* (2013.01)

(58) Field of Classification Search
CPC ........ B62D 24/00; B62D 21/11; B62D 65/02; B62D 23/005; B62D 25/088; B62D 27/023; B62D 33/04; B62D 33/044; B62D 25/20; B62D 27/02; B60Y 2306/01
See application file for complete search history.

(56) References Cited

U.S. PATENT DOCUMENTS

| 4,824,157 A * | 4/1989 | Nielsen | B60P 7/02 |
| | | | 296/10 |
| 6,457,768 B1 * | 10/2002 | Schroeder | B62D 29/043 |
| | | | 296/214 |
| 9,718,498 B1 * | 8/2017 | Faruque | B62D 29/046 |
| 2006/0017303 A1 * | 1/2006 | Weege | B60J 7/062 |
| | | | 296/105 |
| 2010/0026037 A1 * | 2/2010 | Opie | B60J 7/062 |
| | | | 296/100.18 |
| 2021/0171116 A1 * | 6/2021 | Yun | B62D 23/005 |

FOREIGN PATENT DOCUMENTS

| CA | 2486281 A1 * | 1/2006 | ............. B60J 7/062 |
| KR | 20200122605 A | 10/2020 | |

\* cited by examiner

*Primary Examiner* — Paul N Dickson
*Assistant Examiner* — Sara Laghlam
(74) *Attorney, Agent, or Firm* — Slater Matsil, LLP (57) ABSTRACT

An embodiment vehicle body includes a first member extending in a first direction, a second member extending in a second direction intersecting the first direction and coupled to the first member, a reinforcing member extending in a direction intersecting the first direction and the second direction and connecting the first member and the second member, and a reinforcing panel coupled to the reinforcing member, extending in the first direction or the second direction, and connected to the first member or the second member.

20 Claims, 7 Drawing Sheets

VEHICLE BODY FOR VEHICLE

CROSS-REFERENCE TO RELATED APPLICATIONS

This application claims the benefit of Korean Patent Application No. 10-2022-0016747, filed on Feb. 9, 2022, which application is hereby incorporated herein by reference.

TECHNICAL FIELD

The present invention relates to a technology related to a panel assembly.

BACKGROUND

A general structure of a vehicle body is manufactured by machining and welding components through a pressing process using molds. For this reason, there is a problem in that a massive amount of investment is required for facilities such as pressing factories, vehicle body welding factories, and painting factories and a design degree of freedom is low.

In particular, in the case of the vehicle body in the related art, a large number of changes in design are required to manufacture a small number of products of various types. For this reason, there is a problem in that the number of molds is rapidly increased, which inevitably increases production costs.

Recently, it is necessary to simplify a process of manufacturing a vehicle and minimize a development period to meet customer needs and cope with quickly changing market environments in a timely manner.

Therefore, there is a need for a vehicle body structure capable of improving assembly properties of a vehicle body in a smart factory environment while coping with various types of designs.

The foregoing explained as the background is intended merely to aid in the understanding of the background of the present invention, and is not intended to mean that the present invention falls within the purview of the related art that is already known to those skilled in the art.

SUMMARY

The present invention relates to a technology related to a panel assembly. Particular embodiments relate to a technology related to a panel assembly coupled to a vehicle body upper body.

Embodiments of the present invention can increase a coupling force of a vehicle body by coupling a reinforcing panel to a vehicle body configured by coupling a plurality of pipes, thereby improving rigidity of the vehicle body.

According to one embodiment, there is provided a vehicle body for a vehicle, the vehicle body including a first member extending in a first direction, a second member extending in a second direction intersecting the first direction and coupled to the first member, a reinforcing member extending in a direction intersecting the first and second directions and configured to connect the first member and the second member, and a reinforcing panel coupled to the reinforcing member while surrounding the reinforcing member, extending in the first or second direction, and connected to the first or second member.

The reinforcing panel may include a coupling part coupled to the reinforcing member.

The coupling part may be provided in plural, and the plurality of coupling parts may be disposed in a longitudinal direction of the reinforcing member and spaced apart from one another by a preset length.

The reinforcing panel may include a reinforcing rib protruding and extending from the coupling part in a direction intersecting the longitudinal direction of the reinforcing member.

The reinforcing panel may include an assembling part protruding outward and coupled to an outer plate of the vehicle.

The reinforcing panel may include an extension portion extending in the first or second direction, an end of the extension portion extending in the first direction may be connected to the second member, and an end of the extension portion extending in the second direction may be connected to the first member.

A fastening part may be provided at an end of the extension portion and fastened to the first or second member.

The first or second member may be provided in the form of a pipe having an open end, and the fastening part is fastened by being inserted into and caught by the open end of the first or second member.

The first member may be provided in plural, the plurality of first members may be disposed side by side, spaced apart from one another in the second direction, and connected by the second member, the extension portion may extend in the second direction, and two opposite ends of the extension portion may connect the plurality of first members.

The reinforcing panel may be positioned on an upper portion of a suspension coupled to the vehicle body and disperse a load applied from the suspension.

The vehicle body for a vehicle according to embodiments of the present invention is configured by the plurality of pipes, and the plurality of pipes including the first member, the second member, and the reinforcing member are connected in a triangular shape. The reinforcing panel coupled to the reinforcing member extends toward the first member or the second member and is connected to the first member or the second member, thereby improving rigidity of the vehicle body by increasing the coupling force between the first member, the second member, and the reinforcing member which are connected in the triangular shape.

In addition, the reinforcing panel may be positioned on the upper portion of the suspension and disperse a load applied from the suspension, thereby improving durability of the vehicle body.

DETAILED DESCRIPTION OF ILLUSTRATIVE EMBODIMENTS

Specific structural or functional descriptions of embodiments of the present invention disclosed in this specification or application are exemplified only for the purpose of explaining the embodiments according to the present invention, the embodiments according to the present invention may be carried out in various forms, and it should not be interpreted that the present invention is limited to the embodiments described in this specification or application.

Because the embodiments according to the present invention may be variously changed and may have various forms, specific embodiments will be illustrated in the drawings and described in detail in the present specification or application. However, the descriptions of the specific embodiments are not intended to limit embodiments according to the concept of the present invention to the specific embodiments, but it should be understood that the present invention covers all modifications, equivalents and alternatives falling within the spirit and technical scope of the present invention.

The terms such as "first" and "second" may be used herein only to describe various elements, but these elements should not be limited by these terms. These terms are used only for the purpose of distinguishing one constituent element from other constituent elements. For example, without departing from the scope according to the concept of the present invention, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used to just describe a specific embodiment and do not intend to limit the present invention. Singular expressions include plural expressions unless clearly described as having different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present invention pertains. The terms such as those defined in commonly used dictionaries should be interpreted as having meanings consistent with meanings in the context of related technologies and should not be interpreted as having ideal or excessively formal meanings unless explicitly defined in the present specification.

Hereinafter, the present invention will be described in detail through description of preferred embodiments of the present invention with reference to the accompanying drawings. Like reference numerals indicated in the respective drawings refer to like members.

In the related art, a process of manufacturing a vehicle is performed for a comparatively long period of time and a large amount of manufacturing cost is required to provide the vehicle with a suspension for a vehicle, exterior components, interior components, a steering system, a safety device, and the like in consideration of convenience for passengers getting into the vehicle, ride quality for the passengers, safety specifications, external appearances, traveling performance, and the like. In addition, because separate vehicles suitable for various applications need to be manufactured, there is a problem in that it is impossible to manufacture customized vehicles suitable for all applications.

The vehicle, to which the technology according to embodiments of the present invention is applied, is a business vehicle, such as a purpose-built vehicle (PBV), used for various commercial purposes such as product distribution, food trucks, delivery, and service provision. In the case of the illustrated representative embodiment, passengers are not seated in the vehicle, but only freight is loaded into an internal space of the vehicle and transported. Further, the vehicle is driven by an autonomous driving system and used for unmanned delivery of freight or food, product distribution, and product delivery.

The vehicle according to embodiments of the present invention has a simplified structure, such that a process of designing and manufacturing the vehicle may be simplified. The advantage of the vehicle is that components of the vehicle may be modularized and used in common, such that costs may be reduced, a supply of components may be easily performed, and the vehicle may be completely manufactured by mechanically coupling the modularized components of the vehicle by bolting (V), riveting (R), or the like through production processes in an environmentally friendly smart factory without a pressing process, a vehicle body welding process, and a painting process.

Figure 6:
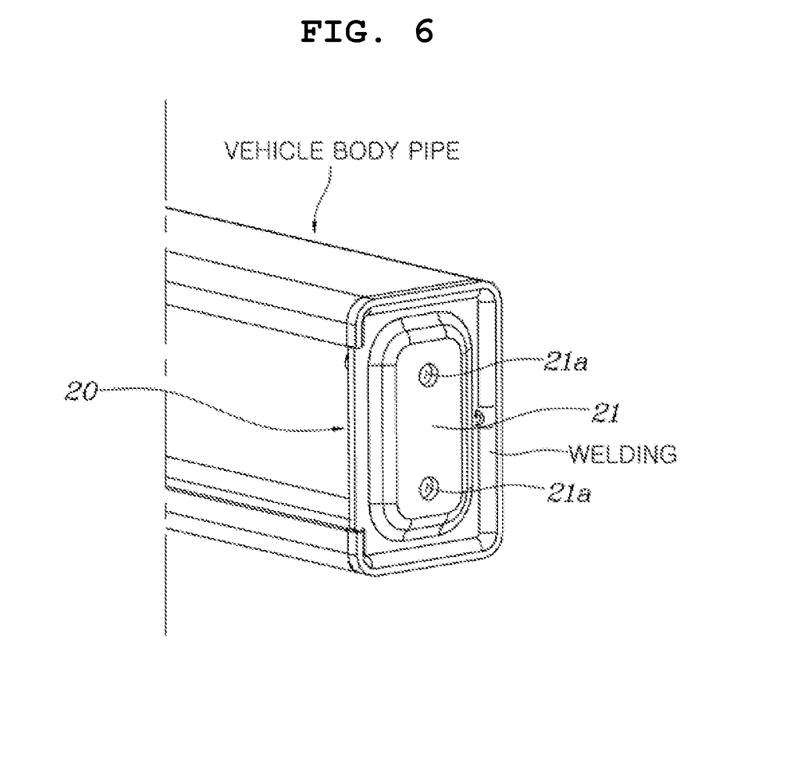
FIG. 6 is a perspective view illustrating a state in which a coupling member is coupled to a pipe end of the vehicle body according to an embodiment of the present invention.

According to embodiments of the present invention, the vehicle body may be configured by a plurality of pipes to reduce manufacturing costs. The pipe may be manufactured by extrusion, roll-forming, or the like, and thus the manufacturing cost is advantageously low. However, it is necessary to reinforce coupling strength at the time of coupling the pipes or coupling the pipe and other panels. Therefore, according to embodiments of the present invention, a coupling member 20 is applied to close an opened end of a pipe of a vehicle body to firmly couple an end of the pipe of the vehicle body to another pipe or the panel, and the coupling member 20 may inhibit deformation of the opened end of the pipe of the vehicle body and provide a coupling surface 21 having a coupling hole 21a to which another component is coupled. FIG. 6 is a perspective view illustrating a state in which the coupling member 20 is coupled to the end of the pipe of the vehicle body according to an embodiment of the present invention. As illustrated in FIG. 6, the coupling member 20 may be welded in a state of being spaced apart inward from the end of the pipe in the longitudinal direction of the pipe, and a welding bead may be disposed in a separation space formed to a degree to which the coupling member 20 is spaced apart inward from the pipe. Therefore, a process of removing the welding bead may be eliminated, such that an operation of integrating the coupling member 20 may be simplified. According to the structure of embodiments of the present invention in which the pipe and the coupling member 20 are integrated, the vehicle body may be easily assembled only by mechanical coupling such as bolting or riveting in the environmentally friendly smart factory, and the structure of embodiments of the present invention may be environmentally friendly because welding or the like is not needed. Some members of the vehicle body may be easily replaced in the event of accidents or maintenance, and various types of vehicles may be easily assembled and produced.

Figure 5:
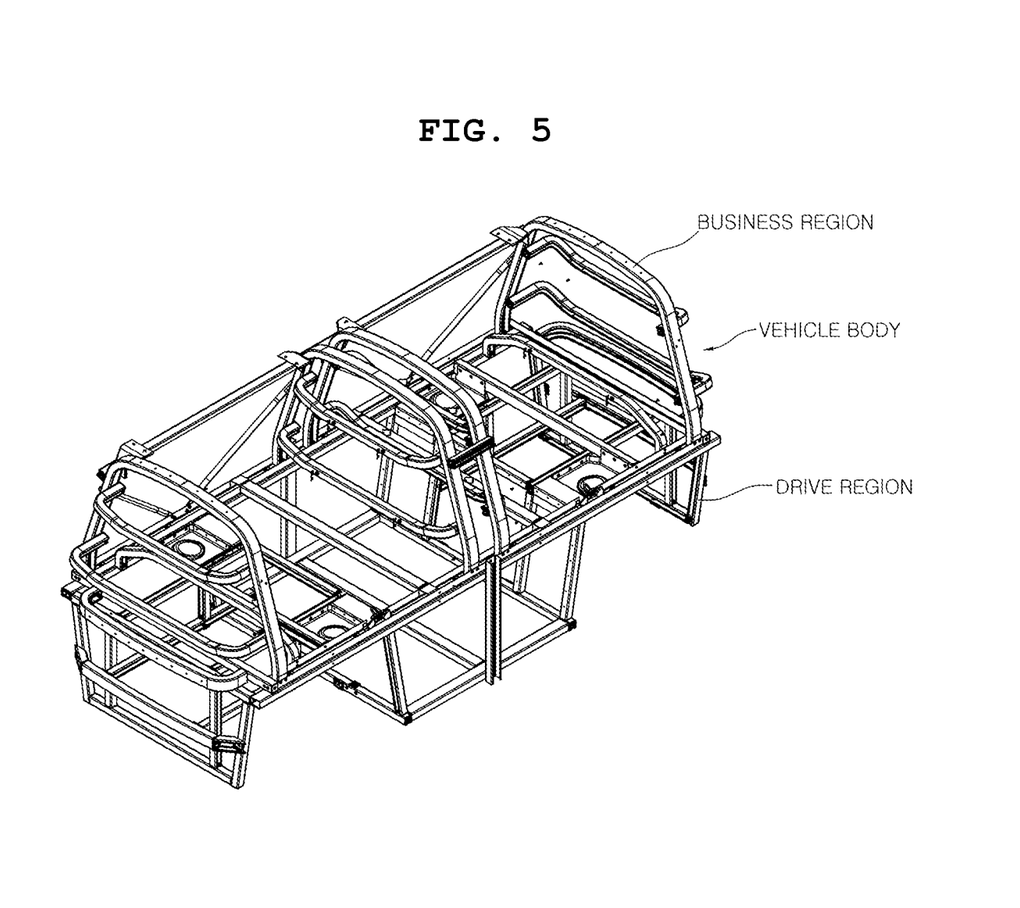
FIG. 5 is a perspective view of the vehicle body for a vehicle according to an embodiment of the present invention.

FIG. 5 is a perspective view of the vehicle body for a vehicle according to embodiments of the present invention.

As illustrated in FIG. 5, the vehicle, to which embodiments of the present invention is applied, may be divided into a business region positioned at an upper side and configured to allow freight to be loaded thereon, and a drive region positioned at a lower side and configured to drive the vehicle. The business region may be variously changed depending on a customer's requirement, and the drive region may be variously changed depending on driving conditions of the vehicle.

Hereinafter, embodiments of the present invention relate to a technology applied to the vehicle and related to a reinforcing panel 400 coupled to a vehicle body to reinforce the vehicle body configured by coupling pipes.

Figure 1:
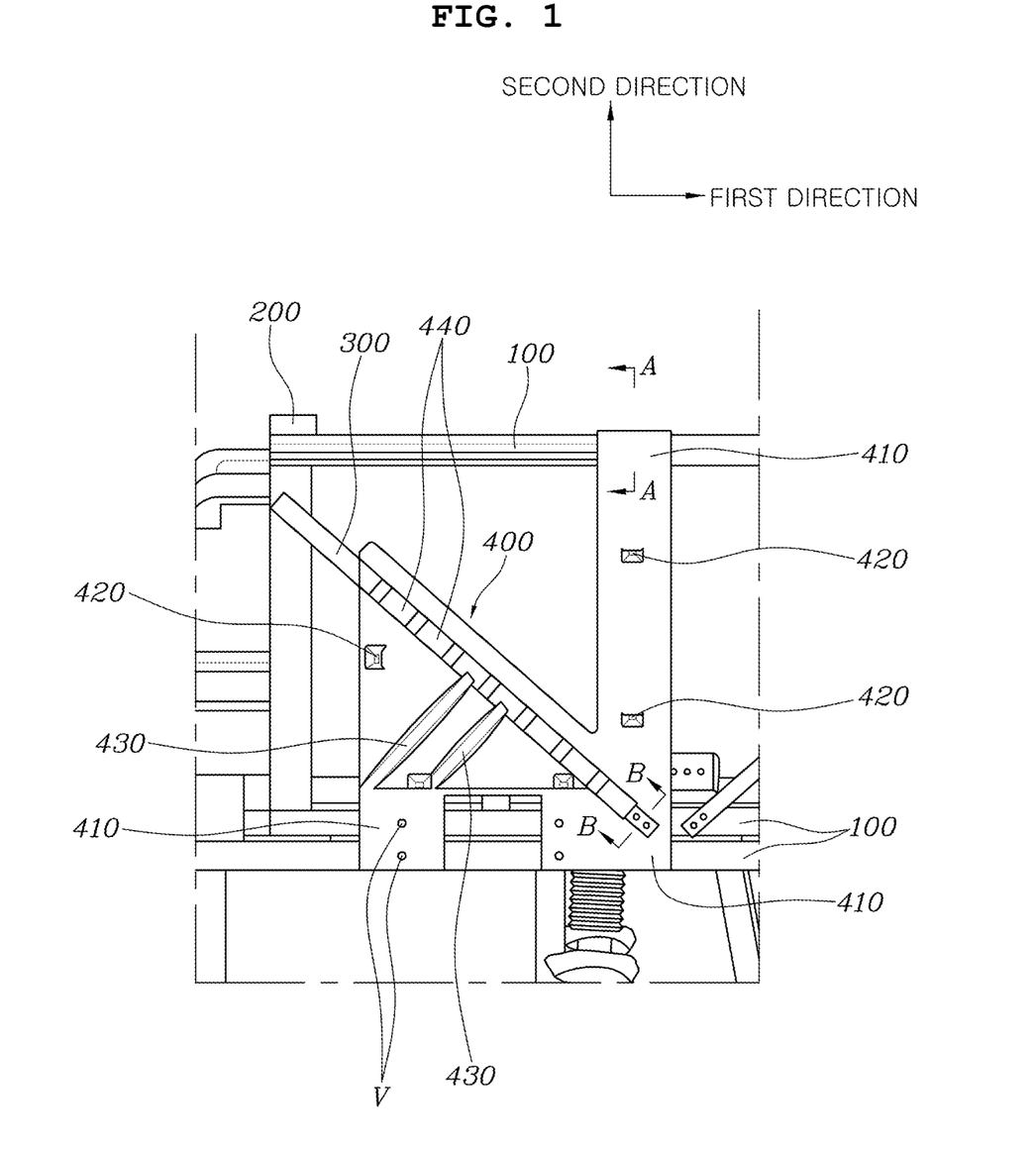
FIG. 1 is a front view of a vehicle body for a vehicle according to an embodiment of the present invention.
Figure 2:
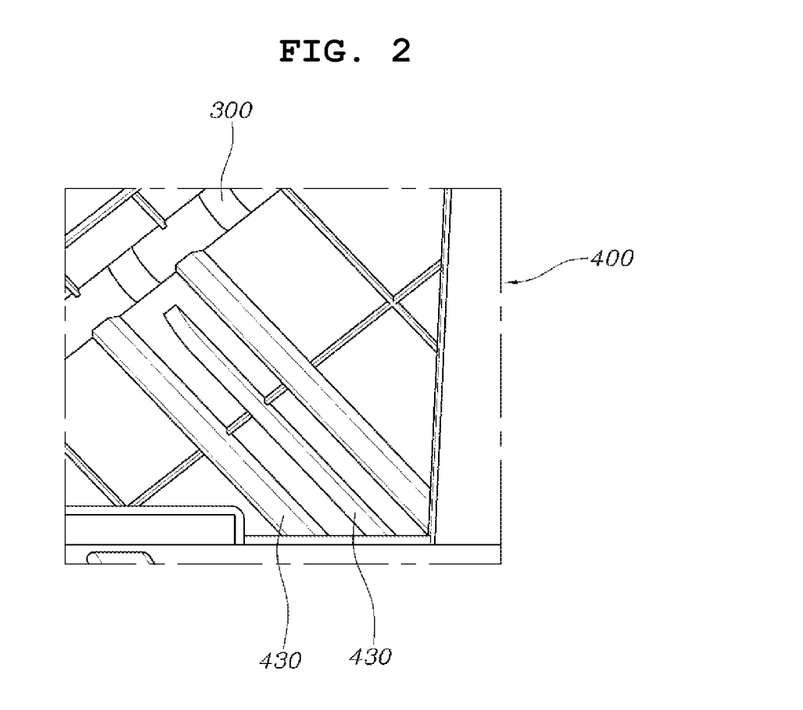
FIG. 2 is a view illustrating a rear surface of a reinforcing panel of the vehicle body for a vehicle according to an embodiment of the present invention.
Figure 3:
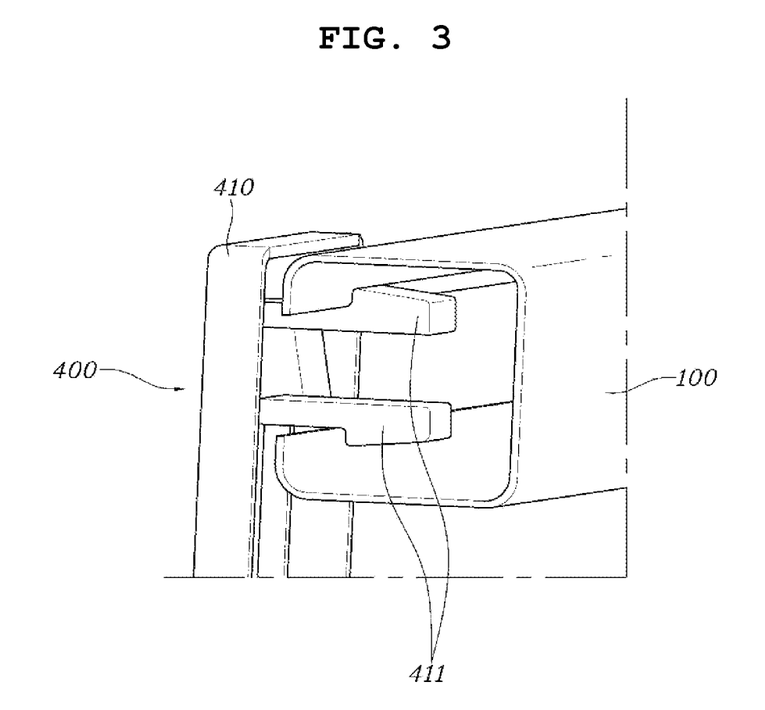
FIG. 3 is a cross-sectional perspective view taken along line A-A in FIG. 1.

FIG. 1 is a front view of a vehicle body for a vehicle according to an embodiment of the present invention, FIG. 2 is a view illustrating a rear surface of the reinforcing panel 400 of the vehicle body for a vehicle according to an embodiment of the present invention, and FIG. 3 is a cross-sectional perspective view taken along line A-A in FIG. 1 and illustrating fastening parts 411 of the reinforcing panel 400 of the vehicle body for a vehicle according to an embodiment of the present invention.

An exemplary embodiment of the vehicle body for a vehicle will be described with reference to FIGS. 1 to 3.

The vehicle body for a vehicle according to embodiments of the present invention includes a first member 100 extending in a first direction, a second member 200 extending in a second direction intersecting the first direction and coupled to the first member 100, a reinforcing member 300 extending in a direction intersecting the first and second directions and configured to connect the first member 100 and the second member 200, and a reinforcing panel 400 coupled to the reinforcing member 300 while surrounding the reinforcing member, the reinforcing panel 400 extending in the first or second direction and connected to the first member 100 or the second member 200.

As illustrated in FIGS. 1 and 2, the first member 100 may extend in the first direction parallel to the ground surface. The second member 200 may extend in the second direction intersecting the first direction. In addition, the reinforcing member 300 may extend in the direction intersecting the first and second directions and connect the first member 100 and the second member 200.

In an embodiment of the present invention, the first direction is illustrated as the direction parallel to the ground surface, and the second direction is illustrated as the direction extending upward while intersecting the first direction. However, the first and second directions may be changed depending on members of the vehicle body. Even in this case, the first and second directions intersect each other without being parallel to each other.

The reinforcing member 300 extends in the direction intersecting the first and second directions. As illustrated in FIGS. 1 and 2, the reinforcing member 300 may extend in a diagonal direction and connect the first member 100 and the second member 200. Therefore, the first member 100, the second member 200, and the reinforcing member 300 may be disposed in a triangular shape.

The reinforcing panel 400 may surround the reinforcing member 300 and be formed such that an end of the reinforcing member 300 is opened so that the reinforcing member 300 may connect the first member 100 and the second member 200. The reinforcing panel 400 may extend in the first or second direction and be connected to the first member 100 or the second member 200.

As illustrated in FIGS. 1 and 2, the reinforcing panel 400 may extend in the second direction and be connected to the first member 100. As another embodiment, the reinforcing panel 400 may also extend in the first direction and be connected to the second member 200.

Therefore, the first member 100, the second member 200, and the reinforcing member 300 are connected in a triangular shape. The reinforcing panel 400 coupled to the reinforcing member 300 extends toward the first member 100 or the second member 200 and is connected to the first member 100 or the second member 200, thereby improving rigidity of the vehicle body by increasing the coupling force between the first member 100, the second member 200, and the reinforcing member 300 which are connected in the triangular shape.

The reinforcing panel 400 may be manufactured by performing injection molding after the reinforcing member 300 is inserted into a mold.

The reinforcing panel 400 may be made of a synthetic resin material that may be injection-molded. Therefore, after the reinforcing member 300 is manufactured by using a metallic material, the reinforcing member 300 may be inserted into the mold for manufacturing the reinforcing panel 400 by injection molding, and then the reinforcing panel 400 may be manufactured by injection molding, such that the reinforcing member 300 and the reinforcing panel 400 may be integrated.

Therefore, even though the reinforcing member 300 made of a metallic material and the reinforcing panel 400 made of a synthetic resin material are made of different materials, the reinforcing member 300 and the reinforcing panel 400 may be easily coupled without being bonded by a separate adhesive material, which may simplify the coupling process.

The reinforcing panel 400 may include a coupling part 440 configured to surround an outer peripheral surface of the reinforcing member 300, and the reinforcing member 300 may be inserted into the coupling part 440.

As illustrated in FIG. 2, the reinforcing panel 400 may have the coupling part 440 configured to surround the reinforcing member 300, and the reinforcing member 300 may be inserted into the coupling part 440.

The coupling part 440 may be formed inside the reinforcing panel 400 and surround the reinforcing member 300, such that the reinforcing panel 400 and the reinforcing member 300 may be integrated. The coupling part 440 may be coupled to the reinforcing member 300 when the reinforcing member 300 is inserted into the mold for the reinforcing member 300 and then the reinforcing panel 400 is manufactured by injection molding. Alternatively, the reinforcing member 300 and the reinforcing panel 400 may be separately manufactured, and then the reinforcing member 300 may be inserted into and coupled to the coupling part 440. In this case, an adhesive material may be applied inside the coupling part 440, and the reinforcing member 300 and the reinforcing panel 400 may be integrally coupled.

Therefore, in the state in which the reinforcing member 300 and the reinforcing panel 400 are integrally coupled, the reinforcing member 300 may be coupled to the first member 100 and the second member 200, and the reinforcing panel 400 may also be connected to the first member 100 or the second member 200.

The coupling part 440 may be provided in plural, and the plurality of coupling parts 440 may be disposed in a longitudinal direction of the reinforcing member 300 and spaced apart from one another by a preset length.

As illustrated in FIG. 2, the plurality of coupling parts 440 may be disposed in the longitudinal direction of the reinforcing member 300 and spaced apart from one another by a preset distance.

Therefore, it is possible to maintain the coupling force between the reinforcing panel 400 and the reinforcing member 300 and reduce a weight of the reinforcing panel 400.

The reinforcing panel 400 may include a reinforcing rib 430 protruding and extending from the coupling part 440 in a direction intersecting the longitudinal direction of the reinforcing member 300.

As illustrated in FIGS. 2 and 3, the reinforcing rib 430 may be formed on one surface or the other surface of the reinforcing panel 400 and extend from the coupling part 440 in the direction intersecting the longitudinal direction of the reinforcing member 300.

In an embodiment of the present invention, the reinforcing rib 430 may be formed on both one surface and the other surface of the reinforcing panel 400. The reinforcing rib 430 may be provided in plural, and the plurality of reinforcing ribs 430 may extend from some or all of the plurality of coupling parts 440.

The reinforcing rib 430 extending in the direction intersecting the longitudinal direction of the reinforcing member 300 may support the reinforcing member 300 and improve rigidity of the vehicle body.

The reinforcing panel 400 may extend from the end of the reinforcing rib 430 and be connected to the first member 100 or the second member 200, thereby increasing the supporting force between the first member 100, the second member 200, and the reinforcing member 300 which are connected in a triangular shape.

Figure 4:
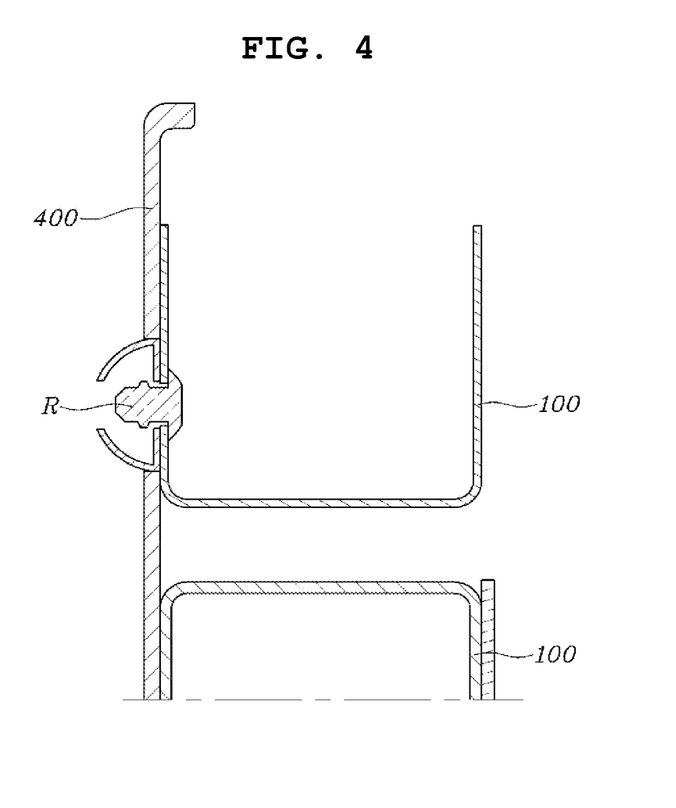
FIG. 4 is a cross-sectional view taken along line B-B in FIG. 1.

FIG. 4 is a cross-sectional view taken along line B-B in FIG. 1.

The vehicle body for a vehicle to which the technology according to embodiments of the present invention is applied may be configured by a plurality of pipes. The first member 100, the second member 200, and the reinforcing member 300 may each have a pipe shape. The first member 100, the second member 200, and the reinforcing member 300 may be coupled by bolting V or riveting R.

The parts including the first member 100, the second member 200, and the reinforcing member 300 are manufactured and modularized independently in production factories. As illustrated in FIG. 2, the vehicle body may be completely manufactured by coupling the modularized parts by a simple mechanical coupling method such as bolting V or riveting R in the smart factory.

Therefore, the vehicle may be completely manufactured by coupling all the modularized parts in the smart factory located in downtown, and the vehicle may be simply remodeled according to the customer's requirement.

As illustrated in FIG. 4, the reinforcing member 300 is coupled to the first member 100 by bolting V or riveting R. FIG. 4 illustrates that the reinforcing member 300 is coupled to the first member 100 by riveting R, but the reinforcing member 300 may be coupled to the first member 100 by bolting V. The reinforcing member 300 may be coupled to the second member 200 in the same coupling method.

The reinforcing panel 400 may include assembling parts 420 protruding outward and coupled to an outer plate of the vehicle.

The reinforcing panel 400 may be coupled to the reinforcing member 300 and connected to the first member 100 or the second member 200, thereby achieving an effect of reinforcing coupling rigidity and improving rigidity of the vehicle body. Further, the reinforcing panel 400 may also serve as an inner panel, and the outer plate of the vehicle may be coupled to the assembling parts 420 formed at an outer side of the reinforcing panel 400.

The reinforcing panel 400 may include an extension portion 410 extending in the first or second direction. An end of the extension portion 410 extending in the first direction may be connected to the second member 200. An end of the extension portion 410 extending in the second direction may be connected to the first member 100.

As illustrated in FIGS. 1 and 2, the reinforcing panel 400 may have the extension portion 410 extending in the first or second direction, and the end of the extension portion 410 may be connected to the first member 100 or the second member 200.

In an embodiment of the present invention, the extension portion 410 may be connected to the first member 100 extending in the second direction, thereby increasing the supporting force between the first member 100 and the reinforcing member 300. Therefore, it is possible to increase the coupling force between the first member 100, the second member 200, and the reinforcing member 300 which are connected in a triangular shape.

The end of the extension portion 410 may be coupled to the first member 100 or the second member 200 by bolting V or riveting R.

FIG. 4 illustrates that the reinforcing panel 400 is coupled to the first member by riveting. Likewise, the extension portion 410 extending toward the first member 100 may be coupled to the first member 100 by bolting V or riveting R. The parts including the first member 100, the second member 200, the reinforcing member 300, and the reinforcing panel 400 are manufactured independently and transported to the smart factory. The parts are coupled simply by bolting V or riveting R in the smart factory, and the vehicle completely made by coupling the parts may be delivered to the customer.

The fastening parts 411 may be provided at the end of the extension portion 410 and fastened to the first member 100 or the second member 200.

As illustrated in FIG. 3, the fastening parts 411 may be provided at the end of the extension portion 410 and fastened to the first member 100 or the second member 200 by an external force applied by an operator without bolting V or riveting R. The fastening parts 411 may be fastened by fitting, thereby simplifying the manufacturing process.

The fastening part 411 will be specifically described below.

The first member 100 or the second member 200 is provided in the form of a pipe having open ends. The fastening parts 411 may be fastened by being inserted into and caught by the open end of the first member 100 or the second member 200.

As illustrated in FIG. 3, the first member 100 may have an open end, and the fastening parts 411 may be fitted into the open end.

Therefore, the fastening part 411 may be coupled to the first member 100 without bolting V or riveting R. This process may reduce the manufacturing costs and simplify the manufacturing process.

Although not illustrated in the drawings, as another embodiment, the fastening part 411 may be coupled to the first member 100 while surrounding the first member 100.

The drawings according to embodiments of the present invention illustrate that the fastening part 411 is fastened to the first member 100. However, the extension portion 410 may also extend toward the second member 200, and the fastening part 411 extending toward the second member 200 may be fastened to the second member 200, thereby increasing the coupling force.

The first member 100 may be provided in plural, and the plurality of first members 100 may be disposed side by side, spaced apart from one another in the second direction, and connected by the second member 200. The extension portion 410 may extend in the second direction, and two opposite ends of the extension portion 410 may connect the plurality of first members 100.

As illustrated in FIGS. 1 and 2, the first members 100, which extend and are spaced apart from one another in the second direction, may be connected by the second member 200.

In this case, the extension portion 410 may extend in the second direction, and the ends of the extension portion 410 may be connected to the first members 100. Therefore, it is possible to increase the coupling force between the first members 100 and increase the coupling force between the reinforcing member 300 and the reinforcing panel 400.

Figure 7:
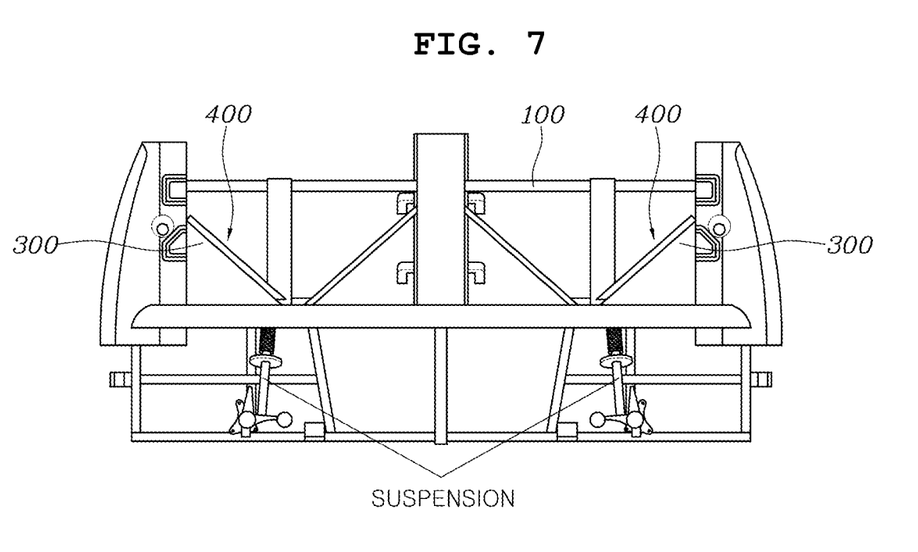
FIG. 7 is a perspective view illustrating a state in which the reinforcing panel is coupled to the vehicle body for a vehicle according to an embodiment of the present invention.

FIG. 7 is a perspective view illustrating a state in which the reinforcing panel is coupled to the vehicle body for a vehicle according to an embodiment of the present invention.

The reinforcing panel 400 may be positioned on an upper portion of a suspension and disperse a load applied from the suspension.

As illustrated in FIG. 7, the reinforcing panel 400 may be positioned on the upper portion of the suspension and disperse a load applied from the suspension, thereby improving durability of the vehicle body.

While the specific embodiments of the present invention have been illustrated and described above, it will be obvious to those skilled in the art that the present invention may be variously modified and changed without departing from the technical spirit of the present invention defined in the appended claims.

What is claimed is:

1. A vehicle body comprising:
a first member extending in a first direction;
a second member coupled to the first member and extending in a second direction intersecting the first direction;
a reinforcing member extending in a direction intersecting the first direction and the second direction, the reinforcing member connecting the first member and the second member; and
a reinforcing panel coupled to the reinforcing member, extending in the first direction or the second direction, and connected to the first member or the second member, wherein the reinforcing panel comprises an assembling part protruding outward and coupled to an outer plate of a vehicle.

2. The vehicle body of claim 1, wherein the reinforcing panel comprises:
a coupling part coupled to the reinforcing member; and
a reinforcing rib protruding and extending from the coupling part in a direction intersecting a longitudinal direction of the reinforcing member.

3. The vehicle body of claim 1, wherein:
the reinforcing panel comprises an extension portion extending in the first direction or the second direction;
an end of the extension portion extending in the first direction is connected to the second member; and
an end of the extension portion extending in the second direction is connected to the first member.

4. The vehicle body of claim 3, further comprising a fastening part provided at the end of the extension portion and fastened to the first member or the second member.

5. The vehicle body of claim 4, wherein:
the first member or the second member comprises a pipe having an open end; and
the fastening part is fastened by being inserted into and caught by the open end of the first member or the second member.

6. The vehicle body of claim 3, wherein:
the first member is provided in plural, and the first members are disposed side by side, spaced apart from one another in the second direction, and connected by the second member; and
the extension portion extends in the second direction and two opposite ends of the extension portion connect the first members.

7. The vehicle body of claim 1, wherein the reinforcing panel is positioned on an upper portion of a suspension coupled to the vehicle body and is configured to disperse a load applied from the suspension.

8. A method of assembling a vehicle body for a vehicle, the method comprising:
coupling a first member extending in a first direction and a second member extending in a second direction intersecting the first direction;
connecting the first member and the second member with a reinforcing member extending in a direction intersecting the first direction and the second direction; and
coupling a reinforcing panel to the reinforcing member and connecting the reinforcing panel to the first member or the second member, wherein the reinforcing panel extends in the first direction or the second direction, wherein the reinforcing panel comprises an assembling part protruding outward and coupled to an outer plate of the vehicle.

9. The method of claim 8, wherein the reinforcing panel comprises:
a coupling part coupled to the reinforcing member; and
a reinforcing rib protruding and extending from the coupling part in a direction intersecting a longitudinal direction of the reinforcing member.

10. The method of claim 8, wherein:
the reinforcing panel comprises an extension portion extending in the first direction or the second direction;
an end of the extension portion extending in the first direction is connected to the second member; and
an end of the extension portion extending in the second direction is connected to the first member.

11. The method of claim 10, further comprising fastening a fastening part provided at the end of the extension portion and fastened to the first member or the second member.

12. The method of claim 11, wherein:
the first member or the second member comprises a pipe having an open end; and
fastening the fastening part comprises inserting the fastening part into the open end of the first member or the second member to be caught by the first member or the second member.

13. The method of claim 10, wherein:
the first member is provided in plural, and the first members are disposed side by side, spaced apart from one another in the second direction, and connected by the second member; and
the extension portion extends in the second direction and two opposite ends of the extension portion connect the first members.

14. The method of claim 8, wherein the reinforcing panel is positioned on an upper portion of a suspension coupled to the vehicle body and is configured to disperse a load applied from the suspension.

15. A vehicle comprising:
a vehicle body comprising:
  a first member, a second member, and a reinforcing member coupled together in a triangular shape, wherein the first member extends in a first direction, the second member extends in a second direction intersecting the first direction, and the reinforcing member extends in a direction intersecting the first direction and the second direction; and
  a reinforcing panel coupled to the reinforcing member, extending in the first direction or the second direction, and connected to the first member or the second member, wherein the reinforcing panel comprises:
    a coupling part coupled to the reinforcing member;
    a reinforcing rib protruding and extending from the coupling part in a direction intersecting a longitudinal direction of the reinforcing member;
    an assembling part protruding outward and coupled to an outer plate of the vehicle; and
a suspension coupled to the vehicle body.

16. The vehicle of claim 15, wherein:
the reinforcing panel comprises an extension portion extending in the first direction or the second direction;
an end of the extension portion extending in the first direction is connected to the second member; and
an end of the extension portion extending in the second direction is connected to the first member.

17. The vehicle of claim 16, further comprising a fastening part provided at the end of the extension portion and fastened to the first member or the second member.

18. The vehicle of claim 17, wherein:
the first member or the second member comprises a pipe having an open end; and
the fastening part is fastened by being inserted into and caught by the open end of the first member or the second member.

19. The vehicle body of claim 18, wherein:
the first member is provided in plural, and the first members are disposed side by side, spaced apart from one another in the second direction, and connected by the second member; and
the extension portion extends in the second direction and two opposite ends of the extension portion connect the first members.

20. The vehicle body of claim 15, wherein the reinforcing panel is positioned on an upper portion of the suspension and is configured to disperse a load applied from the suspension.

* * * * *